United States Patent

Dion et al.

Patent Number: 5,517,375
Date of Patent: May 14, 1996

[54] APPARATUS FOR COUPLING A SPINDLE SHAFT TO A COVER PLATE OF A HARD DISK DRIVE

[75] Inventors: F. Eugene Dion, Longmont; Kris Buchanan, Ft. Collins, both of Colo.

[73] Assignee: Maxtor Corporation, San Jose, Calif.

[21] Appl. No.: 364,423

[22] Filed: Dec. 27, 1994

Related U.S. Application Data

[63] Continuation of Ser. No. 975,389, Nov. 12, 1992, abandoned.

[51] Int. Cl.⁶ .......................... G11B 17/02; H02K 15/00; F16D 3/52
[52] U.S. Cl. .................... 360/98.07; 360/97.01; 360/99.08; 310/42; 310/91; 464/92; 464/96; 29/525; 29/603.03
[58] Field of Search .................... 360/97.01, 98.07, 360/99.08, 99.11; 310/42, 89, 91; 464/87, 92, 96; 369/264, 269; 384/626; 29/525, 603

[56] References Cited

U.S. PATENT DOCUMENTS

| | | | |
|---|---|---|---|
| 2,500,281 | 3/1950 | Fell | 464/92 |
| 3,839,830 | 10/1974 | Bair | 464/92 |
| 4,244,240 | 1/1981 | Rabenhorst | 464/92 |
| 4,701,653 | 10/1987 | Merkle et al. | 360/99.08 |
| 4,728,216 | 3/1988 | Disborg | 29/525 |
| 4,764,152 | 8/1988 | Jörg et al. | 464/87 |
| 4,797,762 | 1/1989 | Levy et al. | 360/98.07 |
| 4,855,857 | 8/1989 | Ono et al. | 360/97.01 |
| 4,899,237 | 2/1990 | Tochiyama et al. | 360/98.07 |
| 4,924,127 | 5/1990 | Boireau et al. | 310/89 |
| 5,158,390 | 10/1992 | Ito et al. | 29/525 |
| 5,212,607 | 5/1993 | Elsing et al. | 360/99.08 |
| 5,214,549 | 5/1993 | Baker et al. | 360/97.02 |
| 5,348,210 | 9/1994 | Linzell | 29/525 |

FOREIGN PATENT DOCUMENTS

| | | | |
|---|---|---|---|
| 60-242552 | 12/1985 | Japan | 360/98.07 |

Primary Examiner—Stuart S. Levy
Assistant Examiner—Jefferson Evans
Attorney, Agent, or Firm—Sheridan Ross & McIntosh

[57] ABSTRACT

An assembly that couples a spindle shaft to the cover of a hard disk drive. The disk drive has a cover that is attached to a baseplate. Extending from the baseplate is a spindle shaft which supports a hub and the magnetic disk of the drive unit. The spindle shaft has a plurality of protrusions which are embedded into a metal shim. The metal shim is coupled to the cover by a sheet of elastomeric material. The metal shim and elastomeric sheet secure the end of the spindle shaft to the cover of the assembly.

6 Claims, 1 Drawing Sheet

APPARATUS FOR COUPLING A SPINDLE SHAFT TO A COVER PLATE OF A HARD DISK DRIVE

This is a continuation of application Ser. No. 07/975,389 filed on Nov. 12, 1992, now abandoned.

BACKGROUND OF THE INVENTION

1. FIELD OF THE INVENTION

The present invention relates to a hard disk drive assembly.

2. DESCRIPTION OF RELATED ART

Hard disk drive assemblies contain one or more magnetic disk that are attached to a hub. The hub is coupled to an electric motor by a stationary spindle shaft. The motor rotates the disk relative to the shaft and an actuator arm. The actuator arm has a head which can magnetize and sense the magnetic fields of the disk, in accordance with a scheme to read and write binary information on the disk. The components of the hard disk assembly are typically enclosed by a cover that is attached to a baseplate.

There is a desire to construct hard disk assemblies in a pluggable card format which can be connected to a computer. Such a construction would allow the user to easily replace hard disk drives and the accompanying memory space in a manner similar to the present use of floppy disk. Continuous handling of a card-sized disk drive may result in the dropping or jarring of the disk assembly. Dropping the card assembly may exert excessive G forces on the disk drive. Such forces may damage the internal components of the drive unit. Additionally, excessive vibrational loading may cause unwanted tracking errors in the drive.

To increase the overall stiffness of the assembly, it is desirable to attach the spindle shaft to both the cover and the baseplate of the unit. Coupling the shaft to the cover and baseplate must be accomplished without necessitating costly tolerances on the piece-parts, or the creation of a gap between the baseplate and cover. It would therefore be desirable to provide a disk drive unit that is easy to assemble, absorbs shock loads and can couple the cover to the spindle shaft without requiring undesirable tolerances on the parts and assembly. It would also be desirable to couple the spindle shaft to the cover in a manner that dampens any vibrational load applied to the disk drive.

SUMMARY OF THE INVENTION

The present invention is an assembly that couples a spindle shaft to the cover of a hard disk drive. The disk drive has a cover that is attached to a baseplate. Extending from the baseplate is a spindle shaft which is connected to an electric motor and the magnetic disk of the disk drive. The spindle shaft has a plurality of protrusions which are embedded into a metal shim typically constructed from a soft aluminum. The metal shim is coupled to the cover by a sheet of elastomeric material. The metal shim and elastomeric sheet secure the end of the spindle shaft to the cover of the assembly.

Coupling the spindle shaft to the cover increases the stiffness of the shaft and the overall assembly. The elastomeric sheet is constructed to absorb external shock an vibrational loads without shearing or otherwise damaging the coupling between the cover and the spindle shaft.

The cover assembly is preferably constructed by first attaching the metal shim to the elastomeric sheet and then bonding the elastomeric sheet to the cover. The cover is then pressed onto the baseplate, such that the protrusions of the spindle shaft become embedded into the metal shim. The space between the inside of the cover and baseplate is typically smaller than the combined length of the shaft, metal shim and elastomeric sheet, so that the elastomer is deflected when the cover is attached to the baseplate. The method of embedding the protrusions into the metal shim and the inclusion of the deflected elastomeric sheet both compensate for tolerances in the components, so that the cover and shaft are always coupled together without creating a gap between the baseplate and cover.

Therefore it is an object of the present invention to provide a cover assembly for a hard disk drive that will couple the spindle shaft to the cover while compensating for tolerances in the assembly.

It is also an object of the present invention to provide a cover assembly for a hard disk drive that can absorb external loads and increases the stiffness of the spindle shaft.

It is also an object of the present invention to provide a cover assembly for a hard disk drive that is inexpensive and easy to assemble.

It is also an object of the present invention to provide a cover assembly for a hard disk drive which dampens any vibrational load applied to the disk drive.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
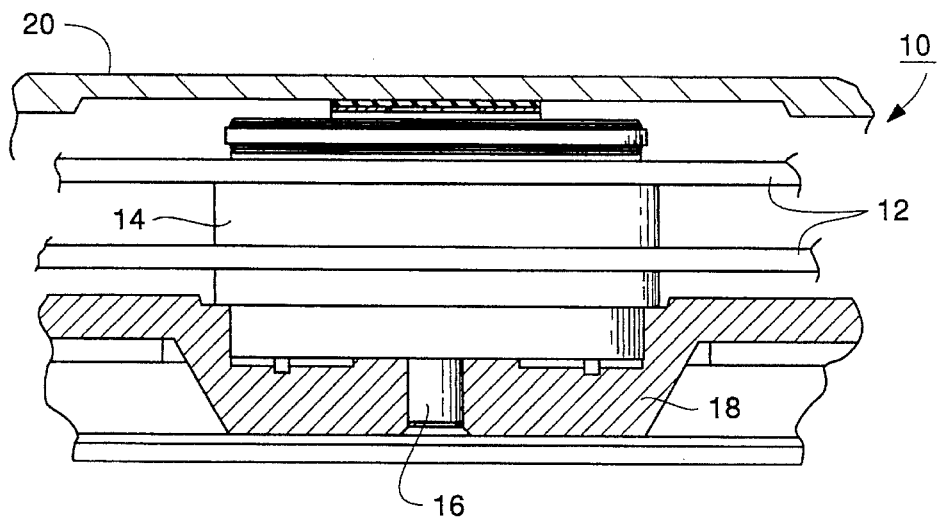
FIG. 1 is a cross-sectional view of a hard disk drive assembly of the present invention.

Referring to the drawings more particularly by reference numbers, FIG. 1 shows a hard disk drive assembly 10 of the present invention. The assembly 10 is typically constructed as a card that can be plugged into a computer. Although a card assembly is described, it is to be understood that the present invention may be used in any type of hard disk assembly. The disk assembly typically includes one or more hard disk 12 attached to a hub 14. The hub 14 is adapted to rotate relative to a spindle shaft 16, and may contain bearings to facilitate the same. The hub 14 is coupled to an electric motor (not shown) which may be located within or below the hub 14. The motor rotates the disk 12 relative to the spindle shaft 16 and an head/actuator arm assembly (not shown) which contains a disk head as is known in the art.

The spindle shaft 16 is mounted to a baseplate 18. The shaft 16 may be attached to the plate 18 by any mounting or fastening means, it being understood that the attachment of the spindle shaft 16 to the baseplate 18 does not limit the scope of the present invention. The disk drive assembly is encapsulated by a cover 20 which is attached to the baseplate 18. The cover 20 may be coupled to the baseplate 18 by screws, adhesive or any other means for attaching the members 18 and 20. The baseplate 18 and cover 20 are typically constructed from aluminum or a hard plastic material to protect the internal assembly.

Figure 2:
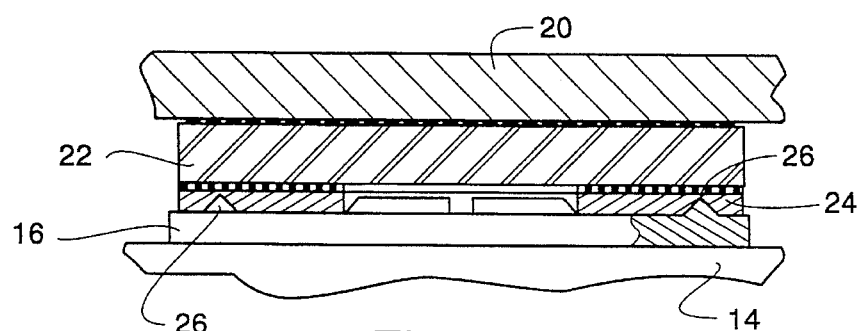
FIG. 2 is an enlarged cross-sectional view of the disk drive assembly of FIG. 1.

As shown in FIG. 2, the spindle shaft 16 is coupled to the cover 20 by an elastomeric sheet 22 and a metal shim 24. In the preferred embodiment, the spindle shaft 16 has a plurality of sharp protrusions 26 which are embedded into the metal shim 24. The spindle shaft 16 is typically constructed from a hard material such as steel, wherein the protrusions 26 readily penetrate the metal shim 24. The metal shim 24 is typically constructed from a soft metal such as a pure aluminum, so that the protrusions 26 can become embedded into the shim 24. In the preferred embodiment, the elastomeric sheet 22 is approximately 0.010–0.025 inches thick and the metal shim is typically 0.002–0.005 inches thick.

The elastomeric sheet 22 is typically bonded to the cover 20 and the metal shim 24 by an adhesive. Alternatively, the elastomeric sheet 22 can be constructed from a material that is applied to the cover 20 and shim 24 in a liquid state and then hardened to rigidly couple the two members 20 and 24. The elastomeric sheet 22 is typically constructed from a viscal elastomer, such as the elastomer sold by Minnesota Manufacturing and Mining under the trademark ISODAMP. The elastomeric sheet 22 is flexible enough to readily deflect when subjected to an external load. The deflection of the elastomer absorbs energy and reduces the stresses in the assembly, particularly the shear stresses between the spindle shaft 16 and the cover 20. The present invention therefore provides a cover assembly, that couples the spindle shaft 16 to the cover 20, and can withstand relatively large shock loads. Coupling the spindle shaft 16 to the cover 20 also creates a shaft 16 that is supported at both ends, as opposed to an unsupported shaft end which would produce a relatively weak cantilever beam. The present invention therefore provides a more rigid spindle shaft 16 member. Additionally, the elastomeric sheet 22 dampens any vibrational loads applied to the assembly 10.

Figure 3:
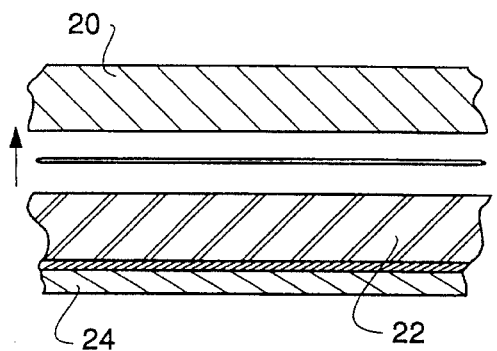
FIG. 3 is a cross-sectional view showing an elastic sheet and a coupling plate attached to a cover.
Figure 4:
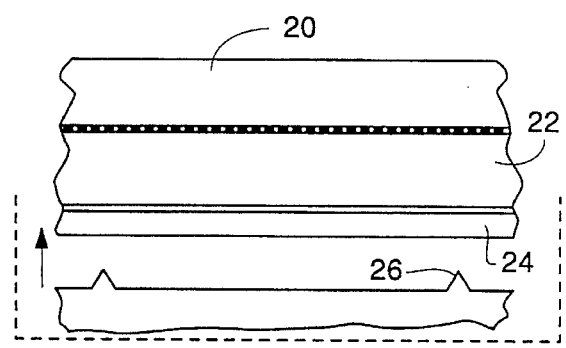
FIG. 4 is a cross-sectional view showing the cover being attached to a baseplate such that protrusions on the top of a spindle shaft are embedded into the coupling plate.

FIGS. 3 and 4 show a preferred method of attaching the cover 20 to the spindle shaft 16. The metal shim 24 is initially attached to the elastomeric sheet 22, typically by an adhesive. The shim 24 and sheet 22 are then bonded to the cover 20. In the alternative, the elastomeric sheet 22 may be bonded to the cover 20 before the shim 24 is attached to the sheet 22. Additionally, the elastomeric sheet 22 may be constructed from a pressure sensitive adhesive material.

The cover 20 is then pressed onto the baseplate 18 so that the protrusions 26 become embedded into the metal shim 24, to couple the cover 20 to the spindle shaft 16. The combined length of the spindle shaft 16, shim 24 and elastomeric sheet 22, in the undeflected state, is typically larger than the distance between the inside surface of the cover 20 and the inside surface of the baseplate 18, so that the elastomeric sheet 22 is deflected when the cover 20 is attached to the baseplate 18. The deflected sheet 22 will compensate for any tolerances in the components and overall assembly of the drive unit. For example, if the spindle shaft 16 is less than the nominal dimension of the part, the sheet 22 will merely have less deflection when the cover 20 is assembled to the plate 18. This is to be contrasted to a rigid mount between the cover 20 and shaft 16, which could produce a gap between the side walls of the baseplate 18 and cover 20. What is thus provided is a cover assembly that is easy to assemble, absorbs external loads, dampens vibration and compensates for tolerances in the assembly.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention may be used to couple the cover to the fixed shaft of the actuator pivot.

What is claimed is:

1. An assembly for a hard disk drive, comprising:

a cover;

an elastomeric sheet attached to said cover;

an aluminum shim attached to said elastomeric sheet; and, a spindle shaft that has a plurality of sharp protrusions that penetrate into said aluminum shim such that said aluminum shim is attached to said spindle shaft and said spindle shaft is attached to said cover solely by said elastomeric sheet and said shim.

2. The assembly as recited in claim 1, wherein said elastomeric sheet is deflected.

3. The assembly as recited in claim 2, wherein said elastomeric sheet is bonded to said cover and said coupling plate by an adhesive.

4. A method for coupling a cover to a spindle shaft of a hard disk drive assembly, comprising the steps of:

a) attaching an aluminum shim to an elastomeric sheet;

b) bonding said elastomeric sheet to a cover; and, c) pressing said cover onto a baseplate which has a spindle shaft with a plurality of sharp protrusions which penetrate into said aluminum shim when said cover is pressed onto said baseplate, wherein spindle shaft is attached to said cover solely by said elastomeric sheet and said shim.

5. The method as recited in claim 4, wherein said elastomeric sheet is attached to said cover before said aluminum shim is attached to said elastomeric sheet.

6. The method as recited in claim 4, wherein said aluminum shim is bonded to said elastomeric sheet.

* * * * *